United States Patent [19]
Tamano et al.

[11] Patent Number: 5,479,977
[45] Date of Patent: Jan. 2, 1996

[54] PNEUMATIC TIRE WITH CARCASS STRUCTURE FOR INCREASED SIDEWALL RIGIDITY

[75] Inventors: Akiyoshi Tamano; Motoo Hayashi, both of Akashi; Kiyonori Sasaoka, Fukushima; Kazuya Suzuki, Shirakawa; Hirotsugu Hasegawa, Kakogawa, all of Japan

[73] Assignee: Sumitomo Rubber Industries, Ltd., Kobe, Japan

[21] Appl. No.: 141,206

[22] Filed: Oct. 26, 1993

[30] Foreign Application Priority Data

Oct. 30, 1992 [JP] Japan ................................. 4-315683
Nov. 5, 1992 [JP] Japan ................................. 4-322635
Dec. 21, 1992 [JP] Japan ................................. 4-357034

[51] Int. Cl.$^6$ ............................. B60C 15/00; B60C 15/06
[52] U.S. Cl. ................... 152/542; 152/209 R; 152/454; 152/525; 152/526; 152/531; 152/533; 152/543; 152/546; 152/547; 152/550; 152/552; 152/554; 152/555
[58] Field of Search ...................... 152/539, 541–543, 152/546, 548, 552, 553, 555, 550, 554, 454, 209 R, 526, 531, 533, 525, 547

[56] References Cited

U.S. PATENT DOCUMENTS

| | | | |
|---|---|---|---|
| 3,961,657 | 6/1976 | Chrobak | 152/541 |
| 4,510,983 | 4/1985 | Ohkuni et al. | 152/541 |
| 4,585,045 | 4/1986 | Morikawa et al. | 152/550 X |
| 4,640,329 | 2/1987 | Nakasaki et al. | 152/550 X |
| 4,766,940 | 8/1988 | Yokoyama et al. | 152/546 |
| 5,111,865 | 5/1992 | Shinmura | |

FOREIGN PATENT DOCUMENTS

| | | | |
|---|---|---|---|
| 673798 | 12/1964 | Belgium . | |
| 395039 | 10/1990 | European Pat. Off. . | |
| 0465188 | 1/1992 | European Pat. Off. | 152/542 |
| 1124766 | 7/1956 | France . | |
| 1069438 | 4/1986 | Japan | 152/542 |
| 0169303 | 7/1986 | Japan | 152/542 |
| 0253205 | 11/1986 | Japan | 152/539 |
| 0265008 | 11/1987 | Japan | 152/542 |

OTHER PUBLICATIONS

Patent Abstracts of Japan, vol. 15, No. 97 (M–1090) 8 Mar. 1991, & JP-A-02 310 110, Takahashi, Dec. 25, 1990.

Primary Examiner—Adrienne C. Johnstone
Attorney, Agent, or Firm—Birch, Stewart, Kolasch & Birch

[57] ABSTRACT

A pneumatic tire having an improved carcass structure capable of increasing the sidewall rigidity, the tire (1) comprising a carcass (8) composed of an inner carcass ply (9) and an outer carcass ply (10), the inner carcass ply having a pair of edges turned up around the bead cores (5) from the axially inside to outside of the tire, each turned up portion thereof extending radially outwardly beyond the maximum tire width point (B), a bead apex (6) disposed between the main portion and the turned up portion, the outer carcass ply having a pair of edges each disposed between the bead apex and each turned up portion of the inner carcass ply, the edges of the outer carcass ply terminated radially outward of the radially inner end of the bead core, each sidewall portion provided with at least one steel cord reinforcing layer (11a, 11b, 11c) made of parallel steel cords.

10 Claims, 5 Drawing Sheets

Fig. 6
CONVENTIONAL
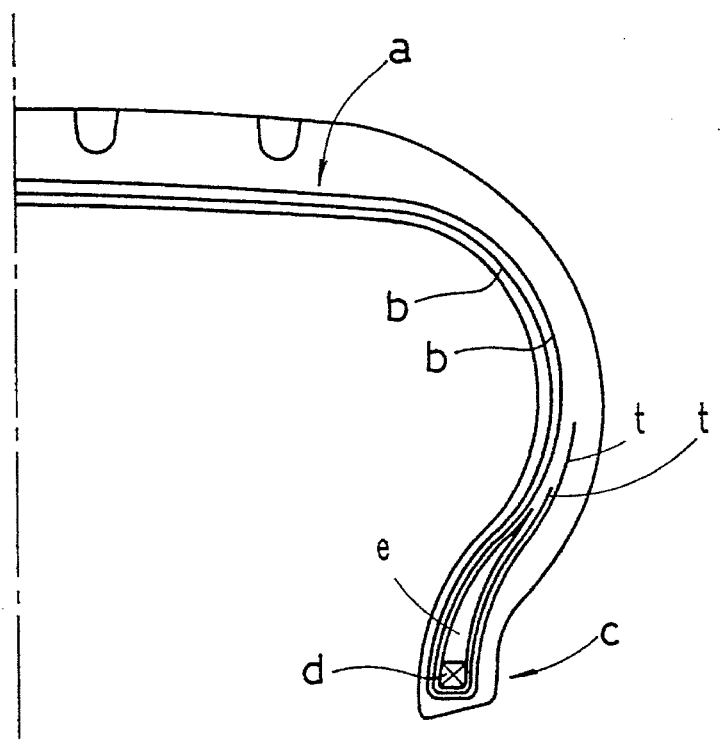
Fig. 7
CONVENTIONAL
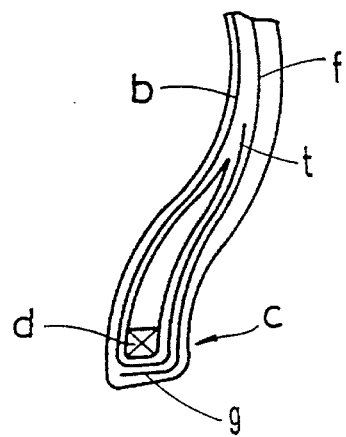

PNEUMATIC TIRE WITH CARCASS STRUCTURE FOR INCREASED SIDEWALL RIGIDITY

The present invention relates to a pneumatic tire having an improved carcass structure capable of increasing the sidewall rigidity.

BACKGROUND OF THE INVENTION

In the pneumatic tires especially that for high performance cars such as sport car, the aspect ratio of the tire is on the decreasing trend.

A conventional carcass structure widely used in such a low aspect ratio tire comprises a carcass ply (b) extending between the bead portions (c) and turned up around bead cores (d) from the axially inside to outside of the tire.

In such a low aspect ratio tire for high performance car, as the tire height is relatively low and the running speed is high, the sidewall portion is required to have a high rigidity to meet severe service conditions.

Therefore, in order to increase the sidewall rigidity, the number of the carcass plies (b) is increased to two plies, and the height of each turned up portion (t) is increased, as shown in FIG. 6.

In such high turnup structure, however, it is difficult to increase the lateral, longitudinal and torsional rigidity of the tire to improve the handling. Further, the total length of the carcass plies is inevitably increased to increase the tire weight.

In order to solve the above-mentioned problems, another carcass structure shown in FIG. 7 has been proposed, wherein the carcass consists of an inner carcass ply (b) tuned up around a bead core (d) from the axially inside to outside of the tire, and an outer carcass ply (f) extending radially inwardly from the tread portion along the axially outside of the inner carcass ply turned up portion (t) and turned axially inside of the tire under the bead core (d). Accordingly, by the inner and outer plies (b and f), a stiff shell structure is formed, and the lateral, longitudinal and torsional rigidity of the tire can be effectively increased.

However, the manufacturing of such a tire is difficult. As a result, not only the production cost is increased, but also the edge (g) of the outer carcass ply (f) under the bead core (d) is easily disturbed, and the force variations of the finished tire are liable to increase to deteriorate the high speed running stability.

SUMMARY OF THE INVENTION

It is therefore, an object of the present invention to provide a pneumatic tire having an improved carcass structure, which is capable of increasing the lateral, longitudinal and torsional rigidity of the tire to improve the handling without increasing the carcass weight, and which can be easily manufactured without increasing the force variations and production cost.

According to one aspect of the present invention, a pneumatic tire comprises:

a tread portion;

a pair of axially spaced bead portions with a bead core disposed in each bead portion;

a pair of sidewall portions extending between the tread portion and each bead portion;

a carcass having an inner carcass ply and an outer carcass ply disposed outside the inner carcass ply; and a bead apex made of hard rubber disposed in each bead portion; wherein the inner carcass ply extends between the bead portions and has a pair of edges turned up around the bead cores from the axially inside to outside of the tire to define two turned up portions and one main portion therebetween, each turned up portion of the inner carcass ply extends radially outwardly from the corresponding bead portion to radially outward of the maximum tire width point, each bead apex is disposed between the main portion and the corresponding turned up portion of the inner carcass ply and tapers radially outwardly from the corresponding bead core, the outer carcass ply has a pair of edges, one of the pair of edges being disposed between the corresponding bead apex and the corresponding turned up portion of the inner carcass ply, the edges of the outer carcass ply are terminated radially outward of the radially inner end of each bead core.

Accordingly, a shell structure is formed by the inner and outer carcass plies, in which the hard rubber bead apex is filled. Therefore, the lateral, longitudinal and torsional rigidity of the tire is effectively increased.

Further, as the outer carcass ply is not extended to under the bead core, the edges thereof are not disturbed, and the force variations are not increased. Further, the carcass weight can be decreased in comparison with the Figs.6 and 7 carcass structures. Furthermore, the manufacturing becomes easier than the FIG. 7 carcass structure but retained at almost the same level as the Fig.6 carcass structure.

BRIEF DESCRIPTION OF THE PREFERRED EMBODIMENTS

Embodiments of the present invention will now be described in detail in conjunction with the accompanying drawings, in which:

FIGS. 1, 2, 3, 4, and 5 are cross sectional views each showing an embodiment of the present invention; and FIGS. 6 and 7 are cross sectional views each showing a conventional carcass structure.

DETAILED DESCRIPTION OF THE PREFERRED EMBODIMENTS

Figure 1:
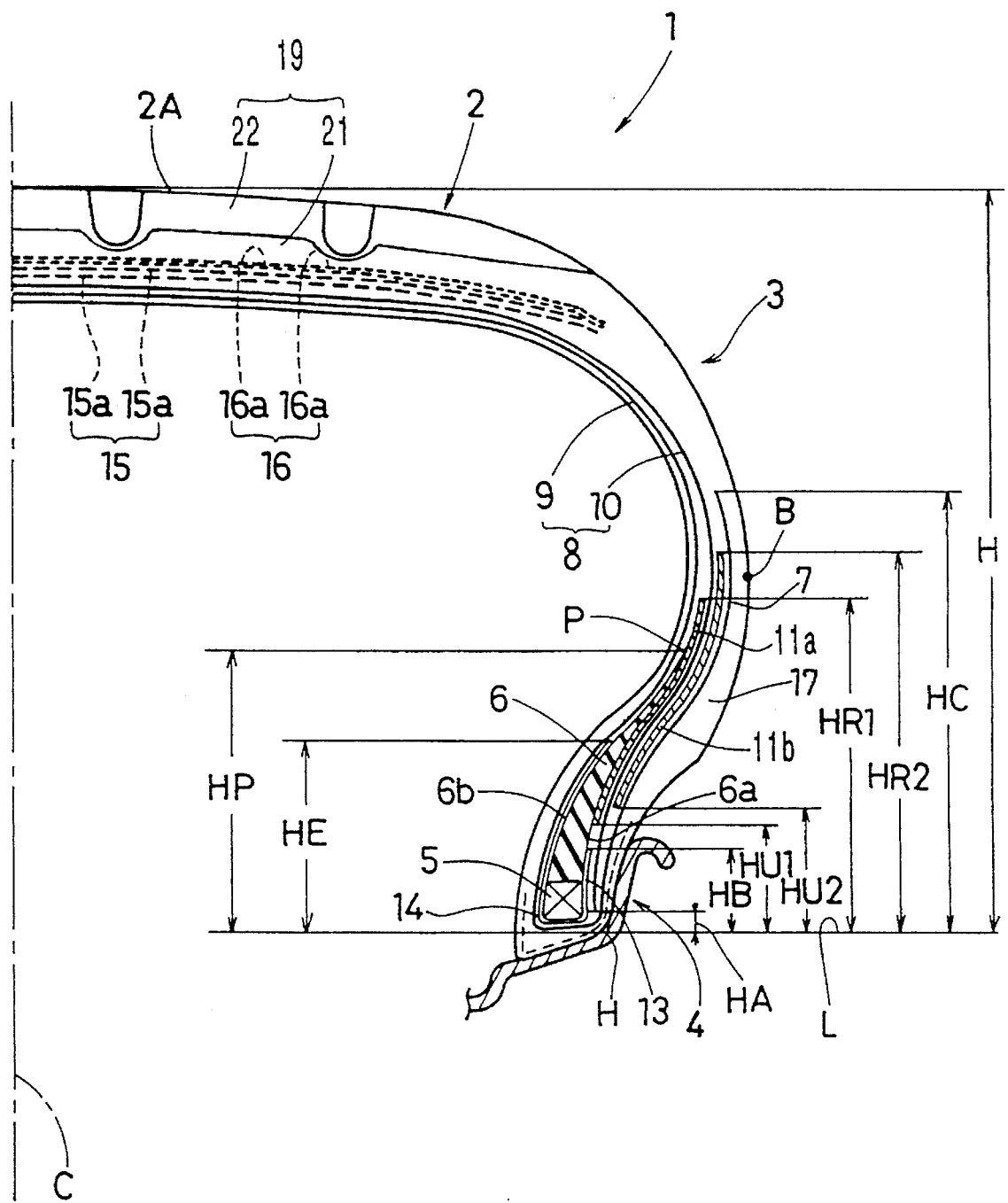

In the figures, pneumatic tire 1 of the present invention comprises a tread portion 2 with a tread surface 2A, a pair of sidewall portions 3 extending radially inwardly from the tread edges, and a pair of bead portions 4 each located at the radially inner end of each sidewall portion 3.

The tire aspect ratio is not more than 60%.

The tire 1 comprises a pair of bead cores 5 each disposed in one of the bead portions 4, a carcass 8 consisting of an inner carcass ply 9 and an outer carcass ply 10, and a belt disposed radially outside the carcass and inside a rubber tread 19.

The rubber tread 19 is composed of a radially inner softer rubber layer 21 disposed on the belt 16 and a radially outer harder rubber layer 22 disposed thereon.

The JIS A hardness of the inner rubber layer 21 is in a lower range of from 50 to 60 degrees to provide ride comfort, and the JIS A hardness of the outer rubber layer 22 is in a higher range of from 62 to 72 degrees to provide wear resistance.

The inner carcass ply 9 extends between the bead portions 4 through the tread portion 2 and the sidewall portions 3 and is turned up around the bead cores 5 from the inside axially to outside of the tire so as to form a pair of turned up portions 7 and a main portion.

Each of the turned up portions 7 extends radially outwardly from the corresponding bead portion 4 beyond the maximum tire width point B.

The outer carcass ply 10 extends through the tread portion 2 and sidewall portions 3. The edges thereof are disposed between the bead apexes 6 and the turned up portions 7 and are not turned up around the bead cores 5, but are terminated within or near the bead portions 4 radially outward of the radially inner ends of the bead cores 5. That is, each edge is terminated axially outward of either the axially outer surface of the corresponding bead core (FIGS. 1–2 embodiments) or the axially outer surface 6a of the, bead apex 6 (FIGS. 3–5 embodiments: edges terminated radially outward of the radially outer ends of the bead cores 5).

Each of the inner and outer carcass plies 9 and 10 is made of organic fiber cords arranged radially of the tire at an angle of from 80 to 90 degrees with respect to the tire equator C so as to have a radial carcass ply structure.

For the carcass cords, nylon, polyester, rayon, aromatic polyamide and the like can be used, but preferably polyester fiber cords, for example 1500d/2, are used.

The belt comprises a radially inner breaker belt 15 and a radially outer band belt The breaker belt 15 comprises two or more cross plies 15a of parallel cords laid at an angle of from 15 to 85 degrees with respect to the tire equator C.

For the breaker belt cords, organic fiber cords, e.g. nylon, rayon, aromatic polyamide and the like may be used, but steel cords are preferably used.

The band belt 16 comprises at least one full width band ply 16a made of cords spirally wound at zero degrees or a small angle with respect to the tire circumferential direction.

For the band belt cords, organic fiber cords, e.g. nylon, aromatic polyamide fiber and the like can be used, but nylon fiber cords are preferably used.

To facilitate the making of the spiral band belt 16, a narrow width strip or ribbon of rubber in which several belt cords are embedded is spirally wound on the breaker belt 15.

In each of the bead portions 4, a bead apex 6 is disposed between the turned up portion 7 and the main portion of the inner carcass ply 9. The bead apex 6 extends radially outwardly taperingly from the radially outside of the bead core 5. The bead apex 6 is made of a hard rubber compound being harder than a sidewall rubber 17 defining the sidewall portion 3.

The JIS A hardness of the bead apex 6 is preferably in the range of from 80 to 95 degrees.

The JIS A hardness of the sidewall rubber 17 is preferably in the range of from 50 to 60 degrees.

Further, in each of the bead portions 4, an organic cord protector layer 14 is disposed. The organic cord protector layer 14 is made of parallel organic fiber cords laid at an angle of 35 to 45 degrees with respect to the tire equator. For those organic cords, nylon fiber cords, aromatic polyamide fiber cords and the like can be used, but nylon fiber cords are preferably used.

The organic cord protector layer 14 comprises its main portion interposed between the axially outer surface of the main portion of the inner carcass ply 9 and the axially inner surface 6b of the bead apex 6, and a turned up portion 13 turned up around the bead core 5 from the axially inside to outside of the tire.

The turned up portion 13 extends along the axially outer face of the bead core 5 and the axially outer face 6a of the bead apex 6 so as to wrap the bead core 5 and a radially inner part of the bead apex therein.

In each of the sidewall portions 3, at least one steel cord reinforcing layer (11a, 11b, 11c, generically 11) made of parallel steel cords adjacent to at least one of the outer carcass ply 10 and the carcass turned up portion 7 is disposed.

The radially outer end of the at least one steel cord reinforcing layer 11 in each sidewall portion 3 is located radially outward of the radially outer end P of the bead apex 6, but radially inward of the radially outer edge of the turned up portion 7 of the inner carcass ply 9.

The radially inner end of the steel at least one cord reinforcing layer 11 is located radially outward of the radially outer end of the bead core 5, preferably 3 to 7 mm radially outward of the radially outer end of the bead core 5.

FIG. 1 shows an embodiment of the present invention, in which the radially inner edge of the outer carcass ply 10 is terminated axially outward of the axially outer face of the bead core.

In this embodiment, two steel cord reinforcing layers 11a and 11b are disposed in each of the sidewall portions 4. One is the axially inner layer 11a disposed between the bead apex 6 and the outer carcass ply 10, and the other is the axially outer layer 11b disposed between the outer carcass ply 10 and the turned up portion 7 of the inner carcass ply 9.

The axially outer layer 11b directly contacts with both the turned up portion 7 of the inner carcass ply 9 and the outer carcass ply 10 all over its length. On the other hand, the radially outer edge portion of the axially inner layer 11a directly contacts with both the main portion of the inner carcass ply 9 and the outer carcass ply 10.

The radially outer end of the axially outer layer 11b is located radially outward of the radially outer end of the axially inner layer 11a.

The radial height HR1 of the radially outer end of the axially inner layer 11a is in the range of from 0.35 to 0.5 times the tire height H, each from the bead base line L. The radial hight HR2 of the radially outer end of the axially outer layer 11b is in the range of from 0.4 to 0.6 times the tire height H, each from the bead base line L. If the height HR1 or HR2 is over the above-mentioned range, the ride comfort is deteriorated. If the height HR1 or HR2 is under the above-mentioned range, it becomes difficult to increase the bead rigidity.

On the other hand, the radially inner end of the axially inner layer 11a is located radially outward of the radially outer end of the bead core 5, preferably 3 to 7 mm outward. The radially inner end of the axially outer layer 11b is located radially outward of the radially inner end of the axially inner layer 11a.

Therefore, the sidewall portion and the bead portion are effectively reinforced to improve the steering stability. However, due to the existence of such rigid layers 11, the bending stress when loaded is liable to concentrate on the edges of the layers. Therefore, to avoid such a concentration, the following relationship is satisfied:

$$HA<HB<HU1<HU2<HE<HP<HR1<HR2<HC$$

wherein

HC is the height of the radially outer end of the turned up portion 7 of the inner carcass ply 9, HR2 is the height of the radially outer end of the axially outer steel cord reinforcing layer 11b, HR1 is the height of the radially outer end of the axially inner steel cord reinforcing layer 11a, HP is the height of the radially outer end P of the bead apex 6, HE is the height of the radially outer end of the main portion of the organic cord protector layer 14, HU2 is the height of the radially inner end of the axially outer steel cord reinforcing layer 11b, HU1 is the height of the radially inner end of the axiaily inner steel cord reinforcing layer 11a, HB is the height of the radially outer end of the turned up portion 1S of the organic cord protector layer 14, HA is the height of the radially inner end of the outer carcass ply 10, each height measured from the bead base line L, whereby the bending rigidity is gradually decreased from the bead base to the sidewall middle part to widely disperse the bending stress, and as a result the durability is effectively improved.

Figure 2:
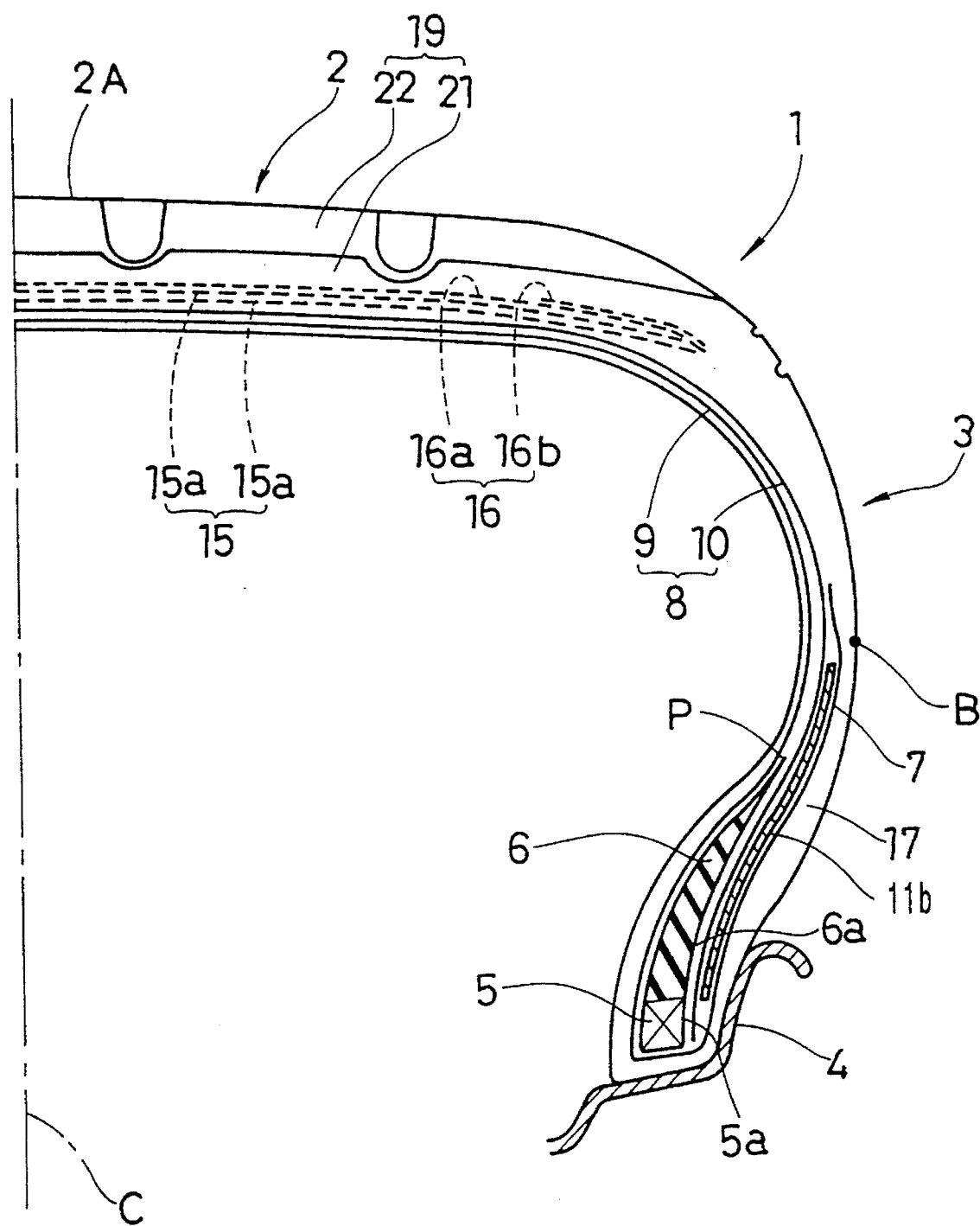

FIG. 2 shows another embodiment of the present invention, which is a modification of the embodiment of FIG. 1.

In this embodiment, the above mentioned axially inner reinforcing layer 11a is omitted. Therefore, in each of the sidewall portions 4, the reinforcing layer 11b is disposed only between the turned up portion 7 and the outer carcass ply 10.

The radial height of the radially outer end of the layer 11b is in the range of from 0.4 to 0.6 times the tire height. In this example, the radially outer end is slightly radially inward of the maximum tire width point B. The radially inner end of the layer 11b is located at the almost same height as the radially outer end of the bead core 5.

The outer carcass ply 10 is terminated radially inward of the radially outer end of the bead core 5, in this example near the bead base. Therefore, the outer carcass ply 10 directly contacts with the axially outer face 6a of the bead apex 6 and the axially outer side 5a of the bead core 5.

The radially outermost band ply 16b is not a full width band ply 16a as shown in FIG. 1, but a so called edge band which consists of axially spaced narrow width pieces one disposed in each shoulder portion.

In this embodiment, the organic cord protector layer 14 is also omitted.

Figure 3:
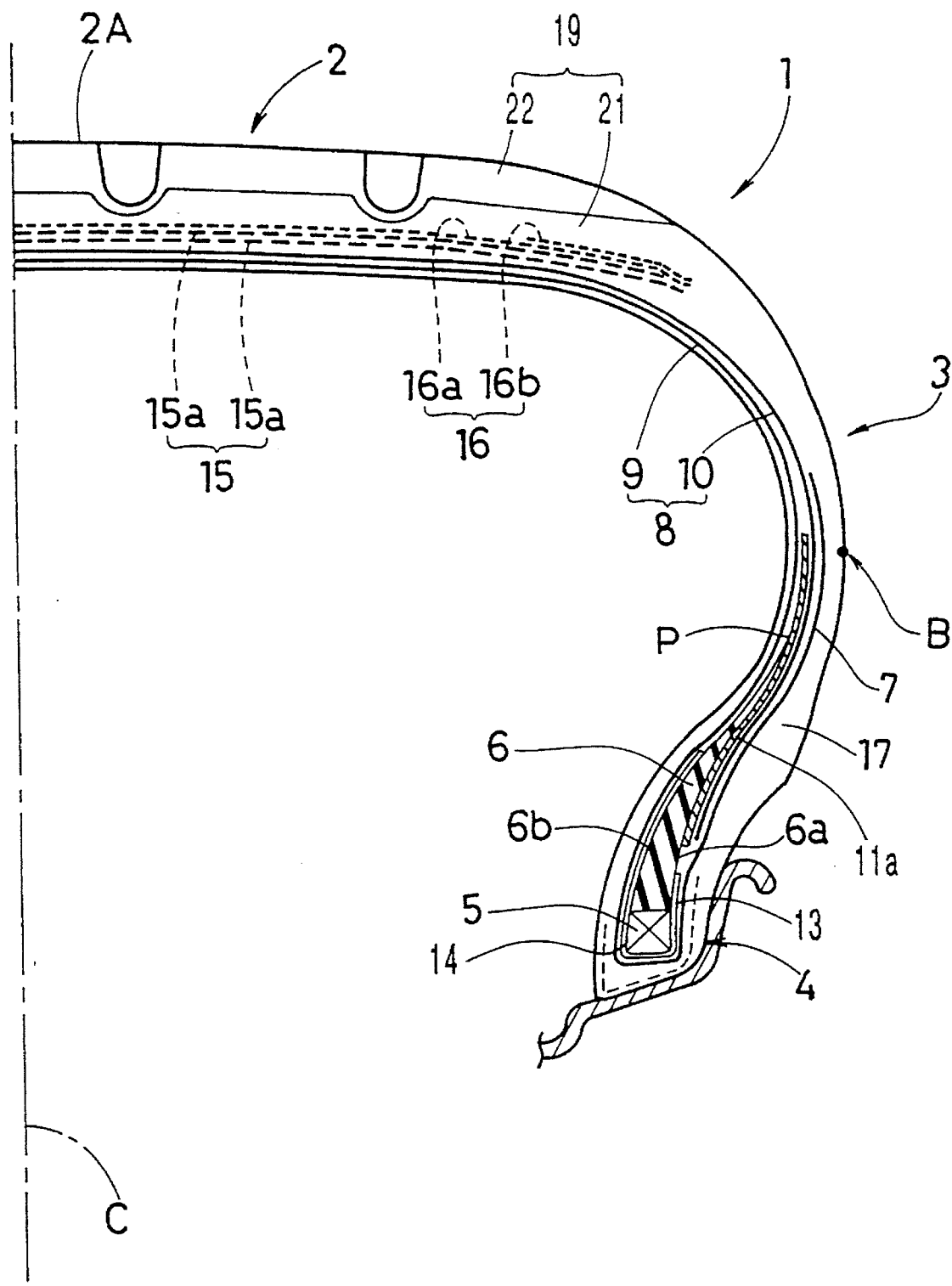

FIG. 3 shows another embodiment of the present invention, which is another modification of the above-explained embodiment of FIG. 1.

In this embodiment, the radially inner edge of the outer carcass ply 10 is terminated axially outward of the axially outer face 6a of the bead apex 6, and the above mentioned axially outer reinforcing layer 11b is omitted. Therefore, in each of the sidewall portions 3, the reinforcing layer 11a is disposed only between the bead apex 6 and the outer carcass ply 10. Therefore, the turned up portion 7 directly contacts with the outer carcass ply 10. Further, the radially outer edge portion of the reinforcing layer 11a directly contacts with both the main portion of the inner carcass ply 9 and the outer carcass ply 10.

The radial height of the radially outer end of the layer 11a is in the range of from 0.4 to 0.6 times the tire height. In this example, the radially outer end is radially outward of the maximum tire width point B.

The radially inner end of the layer 11a is located radially outward of the radially outer end of the bead core 5.

The outer carcass ply 10 is terminated at the almost same height as the radially inner end of the reinforcing layer 11a, that is, radially outward of the radially outer end of the bead core 5.

Similarly to the embodiment of FIG. 2, the radially outermost band ply 16b is the edge band consisting of axially spaced narrow width pieces.

Figure 4:
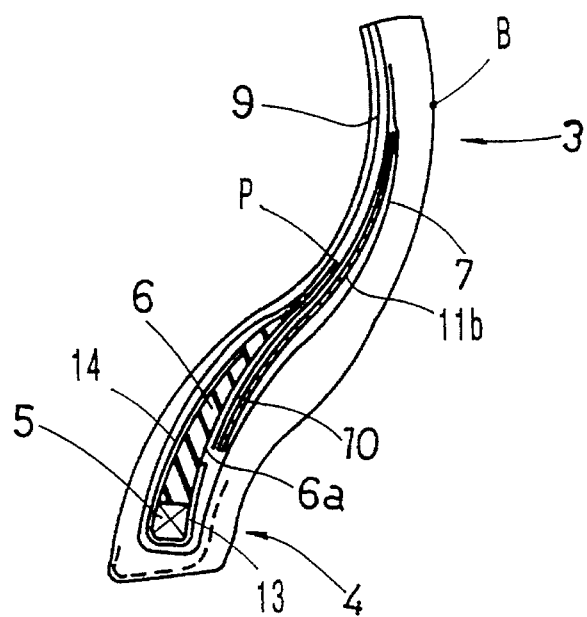

FIG. 4 shows another embodiment of the present invention, which is a modification of the above-explained embodiment of FIG. 3. In this embodiment, only the axially outer reinforcing layer 11b is disposed instead of the axially inner reinforcing layer 11a.

Figure 5:
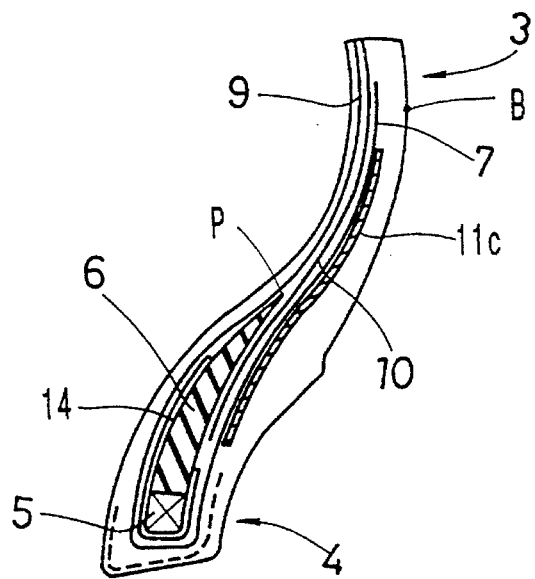

FIG. 5 shows still more another embodiment of the present invention, wherein, in each of the sidewall portion 3, only one steel cord reinforcing layer 11c is disposed axially outward of the turned up portion 7 of the inner carcass ply 9.

The radial height of the radially outer end of the layer 11c is in the range of from 0.4 to 0.6 times the tire height. In this example, the radially outer end is slightly radially inward of the maximum tire width point B.

The radially inner end of the layer 11c is located radially outward of the radially outer end of the bead core 5.

The outer carcass ply 10 is terminated at almost the same height as the radially inner-end of the reinforcing layer 11c, that is, radially outward of the radially outer end of the bead core 5.

As explained above, in the pneumatic tires of the present invention, the inner and outer carcass plies form a shell structure in which the hard rubber bead apex is filled. Therefore, the lateral, longitudinal and torsional rigidity of the tire is effectively increased to improve the handling, but the force variations are not increased. Further, the carcass height is decreased, and the manufacturing is easy.

We claim:

1. A pneumatic tire comprising:

a tread portion;

a pair of axially spaced bead portions with a bead core disposed in each said bead portion;

a pair of sidewall portions, one of said sidewall portions extending between said tread portion and each said bead portion;

a carcass consisting of an inner carcass ply and an outer carcass ply disposed outside said inner carcass ply; and a bead apex made of hard rubber disposed in each said bead portion, wherein said inner carcass ply extends between the bead portions and has a pair of edges turned up around the bead cores from the axially inside to outside of the tire to define two turned up portions and one main portion therebetween, each said turned up portion extends radially outwardly from the corresponding bead portion to radially outward of the maximum tire width point (B), each said bead apex is disposed between the main portion and the corresponding turned up portion and tapers radially outwardly from the corresponding bead core, said outer carcass ply has a pair of edges, each one of said pair of edges being disposed between the corresponding bead apex and the corresponding turned up portion, the edges of the outer carcass ply are terminated radially outward of the radially inner end of each bead core and radially inward of the radially outer end (P) of each said bead apex, and each said sidewall portion is provided with a steel cord reinforcing layer made of parallel steel cords, each said corresponding steel cord reinforcing layer being disposed axially between the corresponding bead apex and the corresponding turned up portion of said inner carcass ply.

2. The pneumatic tire according to claim 1, wherein the edges of the outer carcass ply are terminated radially outward of the radially outer end of each bead core.

3. The pneumatic tire according to claim 1, wherein each bead apex is made of a hard rubber compound having a JIS A hardness of from 80 to 95 degrees.

4. The pneumatic tire according to claim 1, wherein each said bead portion is provided with an organic cord protector layer (14), each said organic cord protector layer (14) comprising a main portion interposed between the axially outer surface of the main portion of the inner carcass ply and the axially inner surface of the corresponding bead apex, and a turned up portion (13) turned up around the corresponding bead core from the axially inside to outside of the tire, said turned up portion (13) extending along the axially outer face of the corresponding bead core and the axially outer face of the corresponding bead apex so as to wrap the corresponding bead core and a radially inner part of the corresponding bead apex therein.

5. The pneumatic tire according to claim 1, wherein said steel cord reinforcing layer in each said sidewall portion is disposed axially between the outer carcass ply and the corresponding bead apex.

6. The pneumatic tire according to claim 1, wherein said steel cord reinforcing layer in each said sidewall portion is disposed axially between the outer carcass ply and the corresponding turned up portion.

7. The pneumatic tire according to claim 1, wherein each said sidewall portion is further provided with another steel cord reinforcing layer made of parallel steel cords and disposed axially between the corresponding bead apex and corresponding turned up portion of said inner carcass ply, one of said steel cord reinforcing layer and said another steel cord reinforcing layer in each said sidewall portion being disposed axially between the outer carcass ply and the corresponding bead apex, the other of said cord reinforcing layer and said another steel cord reinforcing layer in each said sidewall portion being disposed axially between the outer carcass ply and the corresponding turned up portion.

8. A pneumatic tire comprising:

a tread portion;

a pair of axially spaced bead portions with a bead core disposed in each said bead portion;

a pair of sidewall portions, one of said sidewall portions extending between said tread portion and each said bead portion;

a carcass consisting of an inner carcass ply and an outer carcass ply disposed outside said inner carcass ply; and a bead apex made of hard rubber disposed in each said bead portion, wherein said inner carcass ply extends between the bead portions and has a pair of edges turned up around the bead cores from the axially inside to outside of the tire to define two turned up portions and one main portion therebetween, each said turned up portion extends radially outwardly from the corresponding bead portion to radially outward of the maximum tire width point (B), each said bead apex is disposed between the main portion and the corresponding turned up portion and tapers radially outwardly from the corresponding bead core, said outer carcass ply has a pair of edges, each one of said pair of edges being disposed between the corresponding bead apex and the corresponding turned up portion, and the edges of the outer carcass ply are terminated radially outward of the radially inner end of each bead core and radially inward of the radially outer end (P) of each said bead apex, wherein each said sidewall portion is provided with a steel cord reinforcing layer made of parallel steel cords, said steel cord reinforcing layer being disposed axially outward of the corresponding turned up portion.

9. The pneumatic tire according to claim 5, 6, 7 or 8, wherein the radially outer end of each said steel cord reinforcing layer in each said sidewall portion is located radially inward of the radially outer edge of the corresponding turned up portion, but radially outward of the radially outer end (P) of the corresponding bead apex.

10. The pneumatic tire according to claim 5, 8, 7 or 8, wherein the radially inner end of each said steel cord reinforcing layer in each said sidewall portion is located radially outward of the radially outer end of the corresponding bead core.

* * * * *